United States Patent [19]

Yamaguchi et al.

[11] Patent Number: 4,647,503

[45] Date of Patent: Mar. 3, 1987

[54] MAGNETIC RECORDING MEDIUM INCLUDING MAGNETIC LAYER WITH CARBON BLACK PARTICLES AND A FATTY ACID ESTER

[75] Inventors: Nobutaka Yamaguchi; Masaaki Fujiyama; Kazuo Kato; Akira Kashiwagi, all of Kanagawa, Japan

[73] Assignee: Fuji Photo Film Co., Ltd., Kanagawa, Japan

[21] Appl. No.: 802,602

[22] Filed: Nov. 25, 1985

Related U.S. Application Data

[63] Continuation of Ser. No. 509,079, Jun. 29, 1983, abandoned.

[30] Foreign Application Priority Data

Jun. 30, 1982 [JP] Japan ................................ 57-114357

[51] Int. Cl.$^4$ ................................................ G11B 5/72
[52] U.S. Cl. ..................................... 428/323; 428/328; 428/694; 428/695; 428/900; 360/131
[58] Field of Search ............... 428/323, 329, 694, 695, 428/900; 360/131

[56] References Cited

U.S. PATENT DOCUMENTS

| | | | |
|---|---|---|---|
| 3,423,233 | 1/1969 | Akashi et al. ........................ | 428/900 |
| 3,687,725 | 8/1972 | Hartman et al. ..................... | 428/674 |
| 3,929,658 | 12/1975 | Beske ................................. | 428/329 |
| 4,015,042 | 3/1977 | Chassaigne ......................... | 428/325 |
| 4,135,031 | 1/1979 | Akashi et al. ........................ | 428/323 |
| 4,275,115 | 6/1981 | Naruse ................................ | 428/329 |
| 4,320,159 | 3/1982 | Ogawa et al. ........................ | 428/64 |
| 4,348,446 | 9/1982 | Mitsnishi et al. .................... | 428/148 |
| 4,420,532 | 12/1983 | Yamaguchi et al. ................ | 428/329 |
| 4,425,400 | 1/1984 | Yomaguchi et al. ................ | 428/329 |
| 4,539,257 | 9/1985 | Ryoke et al. ........................ | 428/900 |
| 4,546,038 | 10/1985 | Yamaguchi et al. ................ | 428/323 |
| 4,551,386 | 11/1985 | Yamaguchi et al. ................ | 428/900 |

FOREIGN PATENT DOCUMENTS

107314 9/1978 Japan .
134406 11/1978 Japan ................................. 428/328

*Primary Examiner*—George F. Lesmes
*Assistant Examiner*—William M. Atkinson
*Attorney, Agent, or Firm*—Sughrue, Mion, Zinn, Macpeak & Seas

[57] ABSTRACT

A magnetic recording medium is disclosed. The medium is comprised of a non-magnetic support base having a surface with a center line average loughness (Ra) of not more then 0.035 μm, having coated thereon a magnetic layer. The magnetic layer is comprised of a ferromagnetic powder, a fatty acid ester and two types of carbon black dispersed in a binder. The first type of carbon black has an average primary particles sizes of 10 to 30 mμ. The second type of carbon black has an average primary particle size of 60 to 120 mμ. The first type of carbon black and second type of carbon black are present in a mixing weight ratio in the range of 60/40 to 95/5. The magnetic recording medium has excellent electromagnetic properties and provides a tape having good running property and durability.

10 Claims, No Drawings

MAGNETIC RECORDING MEDIUM INCLUDING MAGNETIC LAYER WITH CARBON BLACK PARTICLES AND A FATTY ACID ESTER

This is a continuation of application Ser. No. 509,079, filed June 29, 1983 now abandoned.

FIELD OF THE INVENTION

Carbon black has been incorporated into a magnetic layer in order to provide antistatic properties. Where a single kind of a carbon black does not provide sufficient antistatic properties, a mixture of carbon black having an average particle size of 10 to 30 m$\mu$ and carbon black having an average particle size of 60 to 120 m$\mu$ has been used (Japanese Patent Publication No. 9041/79). It has also been proposed to improve head wear and durability (Japanese Patent Publication No. 18561/77). However, the electromagnetic properties, head wear and durability cannot all be satisfactorily improved at the same time. In the field of high density type compact video recording tape of VHS type and Beta type there is a continually greater need to improve these charactristics.

SUMMARY OF THE INVENTION

An object of the invention is to provide a magnetic recording medium having improved electromagnetic properties, head wear and durability. Another object of the invention is to provide a magnetic recording medium having an improved image quality index, head wear during intermittent running and still life under harsh conditions.

The objects of the invention can be attained by a magnetic recording medium comprising a non-magnetic support having a magnetic layer coated on the surface thereof, said magnetic layer containing (1) a carbon black having an average preliminary particle size of 10 to 30 m$\mu$, (2) a carbon black having an average preliminary particle size of 60 to 120 m$\mu$ (the mixing weight ratio of (1) to (2) is 60/40 to 95/5) and (3) a fatty acid ester, wherein the center line average roughness (Ra) of the surface of the support is not more than 0.035 $\mu$m.

DETAILED DESCRIPTION OF PREFERRED EMBODIMENTS

One type of carbon black (hereinafter "fine carbon particle") used in the invention has an average preliminary particles size of 10 to 30 m$\mu$ and preferably 15 to 25 m$\mu$.

Specific examples of useful fine carbon particles include "Seagull" (23 m$\mu$), "Seast 6H" (24 m$\mu$), "Seast H" (28 m$\mu$) and "Seast 116" (30 m$\mu$) which are manufactured by Tokai Denkyoku Co., Ltd.; "Asahi #80" (23 m$\mu$) and "Asahi #60H" (35 m$\mu$) which are manufactured by Asahi Carbon Co., Ltd.; "Conductex SC" (17 m$\mu$), "Conductex 975" (20 m$\mu$) and "Conductex 950" (21 m$\mu$) which are manufactured by Columbian Carbon Co., Ltd.; "Diablack A" (18 m$\mu$), "Diablack I" (21 m$\mu$), "Diablack H" (30 m$\mu$) and "N600B" (14 m$\mu$) which are manufactured by Mitsubishi Chemical Co., Ltd.; "Shoblack 0" (30 m$\mu$) which is manufactured by Showa Denko Co., Ltd.; "MONARCH 1300" (13 m$\mu$), "REGAL 400" (25 m$\mu$) and "VULCAN XC-72" (30 m$\mu$) which are manufactured by Cabot Co., Ltd.; and the like. Of these, "Asahi #80", "Conductex SC", "Conductex 975", "Conductex 950" and "VULCAN XC-72" are preferably used as fine carbon particles, and "Conductex SC" are particularly preferred. These fine carbon particles can be used alone or in combination.

The other type carbon black (hereinafter "coarse carbon particle") used in the invention has an average preliminary particle size of 60 to 120 m$\mu$ and preferably 70 to 100 m$\mu$.

Specific examples are "Asahi #55" (77 m$\mu$), "Asahi Thermal" (90 m$\mu$), "Asahi #50" (94 m$\mu$), "Asahi #35" (115 m$\mu$) and "HS-500" (85 m$\mu$) which are manufactured by Asahi Carbon Co., Ltd.; "Diablack G" (84 m$\mu$) which is manufactured by Mitsubishi Chemical Co., Ltd.; "REGAL SRF-S" (60 m$\mu$) and "STERLING NS" (75 m$\mu$) which is manufactured by Cabot Co., Ltd.; and the like. Of these, "Asahi #50", "Asahi #35", "Asahi #55" and "Asahi Thermal" are preferably used as coarse carbon particles, and "Asahi #50" is particularly preferred. These coarse carbon particles can be used alone or in combination.

The carbon blacks are used in a total amount of 1 to 20 parts by weight, preferably 3 to 15 parts by weight, based on 100 parts by weight of magnetic particles.

The fine carbon particle and the coarse carbon particle are used in the weight ratio of 60/40 to 95/5, and preferably 70/30 to 90/10.

Any method for adding the carbon blacks can be applied. For example, both the fine and coarse carbon particles can be put in a mixing device to prepare a magnetic composition, or some fine and coarse carbon particles can be put in a mixing device and the rest of the fine and coarse carbon particles can be added after the dispersing has proceeded midway. Where the dispersion of carbon black is important, the carbon blacks can be mixed and kneaded with ferromagnetic particles and a binder by an apparatus such as a three-roll mill or a Bambury mixer and then dispersed by a dispersing apparatus to prepare a magnetic composition. On the other hand, where electroconductivity is important, the carbon blacks can be added after the dispersing step and preparation of the magnetic composition have proceeded mid-way so that the chain structure of the carbon blacks may not be cut. Alternatively, a "carbon master batch" which is a kneaded mixture of the carbon blacks and a binder can be used.

A fatty acid ester used in the invention is composed of a fatty acid having 6 to 32 carbon atoms and an alcohol having 1 to 20 carbon atoms, and preferably of a fatty acid having 8 to 22 carbon atoms and an alcohol having 2 to 10 carbon atoms. The fatty acid includes a saturated fatty acid and an unsaturated fatty acid. The alcohol can be monovalent, di-valent or tri-valent, and is more preferably monovalent.

The fatty acid ester has a melting point of preferably not higher than 70° C., and more preferably not higher than 50° C. If the melting point is higher, the fatty acid ester comes out on the surface of a magnetic layer due to blooming which may cause head stain. The fatty acid ester is preferably used in the amount of 0.05 to 5 parts by weight, more preferably 0.1 to 3 parts by weight, based on 100 parts by weight of magnetic particles. The fatty acid esters can be used alone or in combination.

Useful supports include polyethylene terephthalate, polyethylene naphthalete, polyamide, polyimide, polycarbonate, polyvinyl chloride, triacetyl cellulose and those supports that are commonly used for magnetic recording medium. A support having provided thereon a backing layer which contains a carbon black or an inorganic pigment and a binder can also be used. A support which is vacuum evaporated with aluminum can also be used. If necessary, a support having coated thereon a surfactant or a lubricant and a support with surfaces having different smoothness can be used.

The surface of support on which the magnetic layer is provided must have a center line average roughness (Ra) (cutoff 0.25 mm; needle contact diameter 2 $\mu$R; needle contact speed 0.3 mm/sec.; measured according to JIS-B0601) of not higher than 0.035 $\mu$m. If the surface is rougher than 0.035 $\mu$m, the electromagnetic properties of the recording medium are deteriorated and head wear is increased.

Useful ferromagnetic particles include $\gamma$-Fe$_2$O$_3$, FeOx (1.33<x<1.5), CrO$_2$, Co-added $\gamma$-Fe$_2$O$_3$, Co-added FeOx (1.33<x<1.5), plate-shaped Ba ferrite, Fe-Co-Ni alloy powder and Fe-Zn alloy powder and those ferromagnetic particles which are commonly used for magnetic recording medium.

The iron oxide magnetic particles may have a particle shape, an acicular shape or a spindle shape. It is also possible to use a mixture of particles with different shapes.

Useful binders include a copolymer of vinyl chlorides and vinyl acetate, cellulose derivative, polyurethane, nitrile-butadiene rubber, styrene-butadiene rubber, polyester, polyamide, polyisocyanate and those binders which are commonly used for magnetic recording medium. Of these, a copolymer of vinyl chloride and vinyl acetate, cellulose derivative, polyurethane, polyisocyanate are preferred. The binder is preferably used in an amount of 5 to 100 parts by weight, more preferably 10 to 50 parts by weight based on 100 parts by weight of magnetic particles.

The thickness of the magnetic layer is generally from 1 to 20 $\mu$m, preferably from 2 to 10 $\mu$m and more preferably from 3 to 8 $\mu$m.

An abrasive, a lubricant, a dispersing agent, a stabilizing agent or a plasticizer can be added to the magnetic layer in a conventional manner generally used with magnetic recording medium.

Useful abrasives include Cr$_2$O$_3$, alumina, $\alpha$-Fe$_2$O$_3$, SiC or garnet, which are used in an amount of 0.1 to 15 parts by weight based on 100 parts by weight of magnetic particles. Useful lubricants include a paraffin, a fatty acid, an aliphatic amide, a sorbitan fatty acid ester, a liquid paraffin, a silicone, a fatty acid modified silicone, or a fluorine type oil, which are used in an amount of 0.05 to 15 parts by weight based on 100 parts by weight of magnetic particles. Useful dispersing agents include lecitin, sodium oleate, and the like. Useful stabilizing agents include metal soap, dibutyltin dicarboxylate and the like. Useful plasticizers include dibutyl phthalate (DBP), tricresyl phosphate (TCP) and the like. Solid lubricants such as graphite, MnS$_2$ and the like can also be added.

The invention will be explained more in detail by the following examples. However, the scope of the invention is not limited by these examples. In the examples, "part" means "part by weight".

| Example 1 | |
|---|---|
| | Parts |
| Co-added $\gamma$-Fe$_2$O$_3$ | 100 |
| Fine carbon particle ("Conductex 975" manufactured by Columbian Carbon Co., Ltd. Particle size: 20 m$\mu$) | 8.5 |
| Coarse carbon particle (Asahi #35" manufactured by | 1.5 |

| -continued | |
|---|---|
| Example 1 | |
| | Parts |
| Asahi Carbon Co., Ltd. Particle size: 115 m$\mu$ | |
| Fatty acid ester (Ethyl stearate) | 1 |
| Nitrocellulose | 13 |
| Polyurethane | 7 |
| Polyisocyanate | 8 |
| $\alpha$-Al$_2$O$_3$ | 3 |
| Solvent (Methyl ethyl ketone/ cyclohexanone = 1/1) | 300 |

The above compositions (solid content) were dispersed in a ball mill to prepare a magnetic coating composition, which was then coated on a polyethylene terephthalate film having a thickness of 15 $\mu$m to provide a magnetic layer in a dry thickness of 5 $\mu$m. The magnetic layer was subjected to surface treatment and was slit to a width of ½ inch to prepare a video tape (sample No. 1) for VHS. The polyethylene terephthalte used in this example had the center line average roughness (Ra) of the surfaces of 0.025 $\mu$m.

| Comparative Example 1 | |
|---|---|
| | Parts |
| Co-added $\gamma$-Fe$_2$O$_3$ | 100 |
| Fine carbon particle ("N600B" manufactured by Mitsubishi Chemical Co., Ltd. Particle size: 14 m$\mu$) | 1.2 |
| Coarse carbon particle ("HS-500" manufactured by Asahi Carbon Co., Ltd. Particle size: 85 m$\mu$) | 2.8 |
| Vinyl chloride-vinyl acetate copolymer containing vinyl alcohol | 20 |
| Polyurethane prepolymer | 13 |
| Cr$_2$O$_3$ | 0.9 |
| Lauric acid | 0.5 |
| Liquid paraffin | 0.7 |
| Solvent (Methyl ethyl ketone/ toluene = 1/1) | 270 |

The above compositions were treated in the same manner as in Example 1 and coated on a polyethylene terephthalate film having a thickness of 15 $\mu$m and Ra of 0.040 $\mu$m to prepare a magnetic layer in a dry thickness of 5 $\mu$m. The same steps were repeated as in Example 1 to prepare sample No. 2.

COMPARATIVE EXAMPLE 2

The same procedure as in Example 1 was repeated to prepare sample Nos. 3 to 6 except that 10 parts of the following carbon black was used instead of the two kinds of carbon blacks.

No. 3: "Conductex 975" (20 m$\mu$) manufactured by Columbian Carbon Co., Ltd.

No. 4: "Asahi #60H" (35 m$\mu$) manufactured by Asahi Carbon Co., Ltd.

No. 5: "Diablack G" (84 m$\mu$) manufactured by Mitsubishi Chemical Co., Ltd.

No. 6: "Asahi #35 (115 m$\mu$) manufactured by Asahi Carbon Co., Ltd.

COMPARATIVE EXAMPLE 3

The same procedure was repeated as in Example 1 except that the mixing ratio of fine carbon particle and coarse carbon particle was 25/75 and 50/50 instead of 85/15 to prepare sample Nos. 7 and 8.

EXAMPLE 2

The same procedure as in Example 1 was repeated except that the mixing ratio of fine carbon particle and coarse carbon particle was 60/40, 70/30, 90/10 and 95/5 instead of 85/15 (in the same manner as in Comparative example 3, the total amounts were the same) to prepare sample Nos. 9 to 12.

EXAMPLE 3

The same procedure as in Example 1 was repeated except that Ra of the support was 0.015 $\mu$m, 0.030 $\mu$m and 0.035 $\mu$m to prepare sample Nos. 13 to 15.

COMPARATIVE EXAMPLE 4

The same procedure as in Example 1 was repeated except that Ra of the support was 0.040 $\mu$m to prepare sample 16.

COMPARATIVE EXAMPLE 5

The same procedure as in Example 1 was repeated except that the fatty acid ester was removed to prepare sample No. 17.

Evaluation of sample Nos. 1 to 17 was carried out by the following methods. The video tape recorder (VTR) used for the evaluation was a VHS type VTR. The image quality index was defined so as to totally determine image quality as rectangler areas of a video S/N in a horizontal axis and a color S/N in a vertical axis in comparison with rectangler areas of standard magnetic recording tape. For example, if a sample of a magnetic recording tape has a video S/N measurement 1.26 times (2 dB) better than the standard tape and a color S/N measurement 1.26 times (2 dB) better than the standard tape, the image quality index will be about 1.6 (i.e., 1.26×1.26).

The measurement of head wear of magnetic recording tapes has conventionally been carried out after they repeatedly ran in a VTR for a definite time (e.g., 100 hours), the method is not necessarily sufficient because it is different from practical uses of the tape. Therefore, the intermittent running operation wherein magnetic recording tapes to be tested were allowed to stand for 24 hours after they ran for 10 hours was repeated, and then head wear was measured after total running of 100 hours. This method provided a more harsh evaluation than conventional methods due to increasing head wear.

The still life measurement was a measurement of the time that it took for images to disappear when the VTR was set at a still mode while applying a back tension on the magnetic recording tape to be tested, the tension being increased 1.2 times more than usual. Where the time reached 120 minutes or more, the evaluation was stopped.

The results of evaluations of sample Nos. 1 to 17 are shown in the following table.

TABLE

| Example or Comparative Example | Sample No. | Carbon Black Type (m$\mu$/m$\mu$) | Carbon Black Ratio (by weight) | Ra ($\mu$m) | Fatty acid ester | Image quality index | Still life (time) | Head wear ($\mu$m/100 hrs) |
|---|---|---|---|---|---|---|---|---|
| Example 1 | 1 | 20/115 | 85/15 | 0.025 | present | 1.5 | 120< | 1.0 |
| Comp. Example 1 | 2 | 14/85 | 30/70 | 0.040 | none | 0.8 | 2 | 6 |
| Comp. Example 2 | 3 | 20 | — | 0.025 | present | 1.5 | 20 | 1.0 |
| " | 4 | 35 | — | " | " | 1.35 | 75 | 3 |
| " | 5 | 84 | — | " | " | 0.9 | 120< | 5 |
| " | 6 | 115 | — | " | " | 0.5 | 120< | 10 |
| Comp. Example 3 | 7 | 20/115 | 25/75 | " | " | 1.05 | 120< | 5.0 |
| " | 8 | " | 50/50 | " | " | 1.4 | 120< | 2.1 |
| Example 2 | 9 | " | 60/40 | " | " | 1.5 | 120< | 1.2 |
| " | 10 | " | 70/30 | " | " | 1.5 | 120< | 1.0 |
| " | 11 | " | 90/10 | " | " | 1.5 | 120< | 1.0 |
| " | 12 | " | 95/5 | " | " | 1.5 | 120< | 1.0 |
| Example 3 | 13 | 20/115 | 85/15 | 0.015 | " | 1.55 | 120< | 1.0 |
| " | 14 | " | " | 0.030 | " | 1.45 | 120< | 1.0 |
| " | 15 | " | " | 0.035 | " | 1.35 | 120< | 1.3 |
| Comp. Example 4 | 16 | " | " | 0.040 | " | 1.0 | 120< | 3.5 |
| Comp. Example 5 | 17 | " | " | 0.025 | none | 1.3 | 10 | 4 |

As is apparent from the table, sample No. 1 has a better image quality index, head wear and still life than sample No. 2 containing a mixture of conventional carbon black (Japanese Patent Publication No. 9041/79) and samples Nos. 3 to 6 containing a single type of carbon black. Where sample No. 1 and sample No. 4 are compared, sample No. 1 containing the mixture of carbon black (20 m$\mu$/115 m$\mu$, 85/15, weight average size 34 m$\mu$) is shown to possess good characteristic which sample No. 4 containing uniformly same sized carbon black (35 m$\mu$, which is nearly the same with the above) does not have.

When samples Nos. 1, 7 to 12 are compared changing the mixing ratio of fine carbon particle and coarse carbon particle, it is clear that the range between 60/40 and 95/5 is preferable and the range between 70/30 and 90/10 is more preferable.

Samples Nos. 1, 13 to 16 have a surface with a variable center line average roughness (Ra). Sample No. 16. is apparently bad with respect to its image quality index and head wear and therefore, the center line average roughness (Ra) must not be more than 0.035 $\mu$m.

Sample No. 17 was the same as sample No. 1 with the fatty acid ester removed. Still life is remarkably deteriorated as are the image quality index and head wear. Therefore, it is apparent that the present of the fatty acid ester is very important with respect to obtaining good results with the present invention.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support base having a surface which has a center line average roughness (Ra) of not more than 0.035 μm, and a magnetic layer coated on the surface of the support base, the magnetic layer comprising a binder and:
    (1) carbon black particles having an average primary particle size within the range of 10 to 30 mμ;
    (2) carbon black particles having an average primary particle size within the range of 60 to 120 mμ, wherein the mixing weight ratio of (1)/(2) is in the range of 70/30 to 90/10;
    (3) a fatty acid ester having a melting point of 70° C. or less; and
    (4) a ferromagnetic powder.

2. A magnetic recording medium as claimed in claim 1, wherein the carbon black particles (1) have an average primary particle size in the range of 15 to 25 mμ.

3. A magnetic recording medium as claimed in claim 1, wherein the carbon black particles (2) have an average primary particle size within the range of 70 to 100 mμ.

4. A magnetic recording medium as claimed in claim 1, wherein the carbon black particles (1) and carbon black particles (2) are present in a total amount within the range of 1 to 20 parts by weight per 100 parts by weight of the ferromagnetic powder.

5. A magnetic recording medium as claimed in claim 4, wherein the carbon black particles (1) and carbon black particles (2) are present in a total amount within the range of 3 to 15 parts by weight per 100 parts by weight of the ferromagnetic powder.

6. A magnetic recording medium as claimed in claim 1, wherein the fatty acid ester is comprised of a fatty acid containing 6 to 32 carbon atoms and an alcohol containing 1 to 20 carbon atoms.

7. A magnetic recording medium as claimed in claim 6, wherein the fatty acid contains 8 to 22 carbon atoms and the alcohol contains 2 to 10 carbon atoms.

8. A magnetic recording medium as claimed in claim 1, wherein the fatty acid ester has a melting point of 50° C. or less.

9. A magnetic recording medium as claimed in claim 8, wherein the fatty acid ester is present in an amount within the range of 0.05 to 5 parts by weight per 100 parts by weight of the ferromagnetic powder.

10. A magnetic recording medium as claimed in claim 9, wherein the fatty acid ester is present in an amount within the range of 0.1 to 3 parts by weight per 100 parts by weight of the ferromagnetic powder.

* * * * *